United States Patent [19]

Felkner et al.

[11] Patent Number: 5,006,699
[45] Date of Patent: Apr. 9, 1991

[54] SYSTEM FOR COLLECTING MEDICAL DATA

[76] Inventors: Donald J. Felkner, 15807 W. 136th St., Olathe, Kans. 66062; James R. Famuliner, 1010 S. 49th St. Dr., Blue Springs, Mo. 64015

[21] Appl. No.: 120,367
[22] Filed: Nov. 13, 1987
[51] Int. Cl.$^5$ ............................................. G06K 7/10
[52] U.S. Cl. ................................... 235/472; 235/375; 235/462; 235/488
[58] Field of Search ............... 235/472, 375, 488, 462; 364/708, 709.1

[56] References Cited

U.S. PATENT DOCUMENTS 4,075,702 2/1978 Davies ......................... 364/708 X
4,825,058 4/1989 Poland .............................. 235/472
4,896,027 1/1990 Drexler ............................ 235/488

Primary Examiner—David Trafton
Attorney, Agent, or Firm—Kokjer, Kircher, Bradley, Wharton, Bowman & Johnson

[57] ABSTRACT

A data collection system especially for in-hospital medical data collection combines the advantages of manual and computerized data recording. A portable data terminal unit is carried in a specially constructed carrying case which also holds patient related data in bar code form. A bar code reader connected with the data terminal unit by a cord may be scanned over the bar codes to input data more quickly and easily than when key pad entry of the data is required. Printed documents can also be carried in the case.

18 Claims, 2 Drawing Sheets

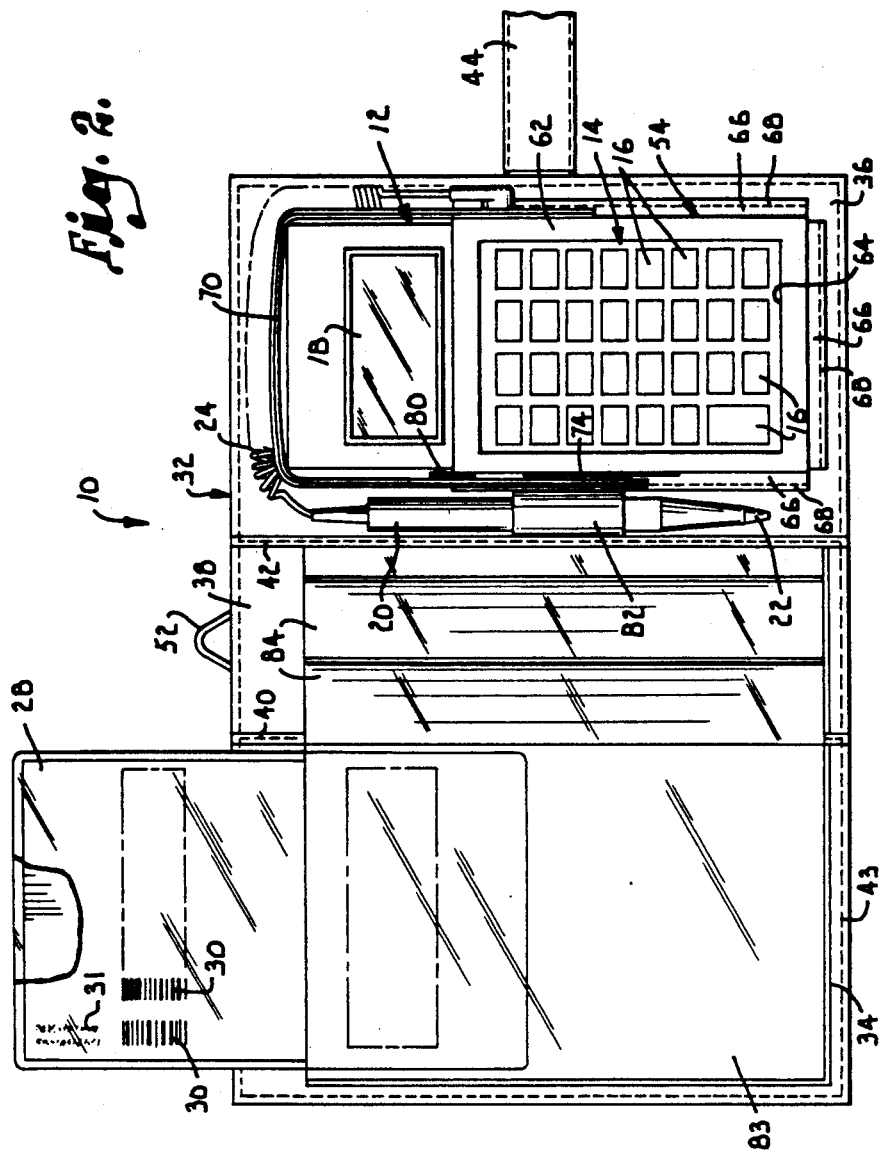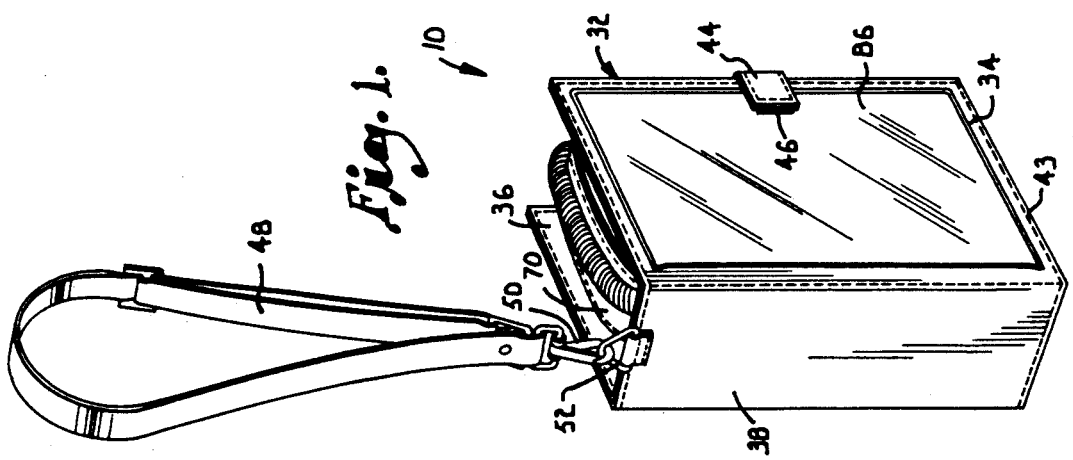

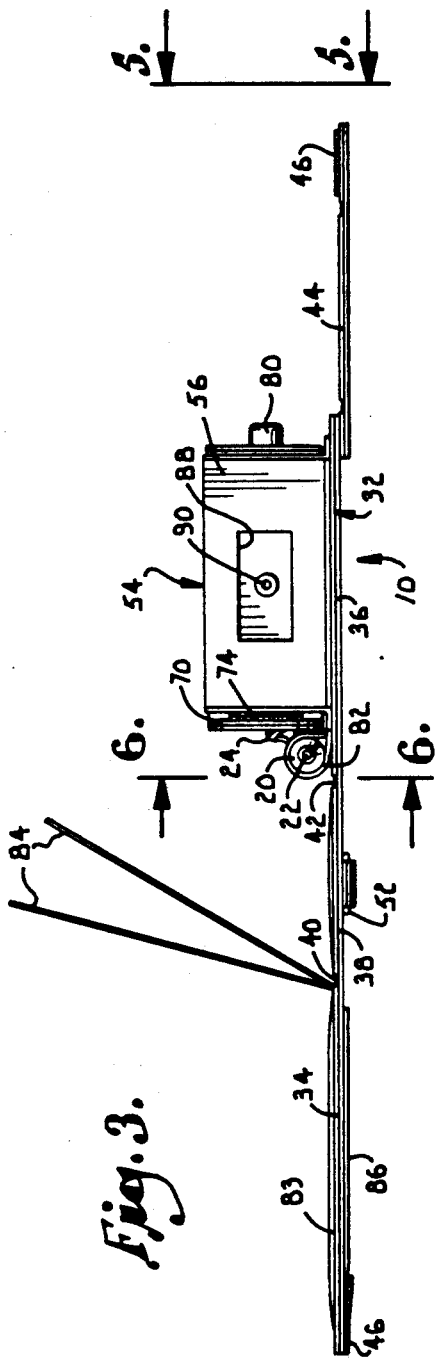
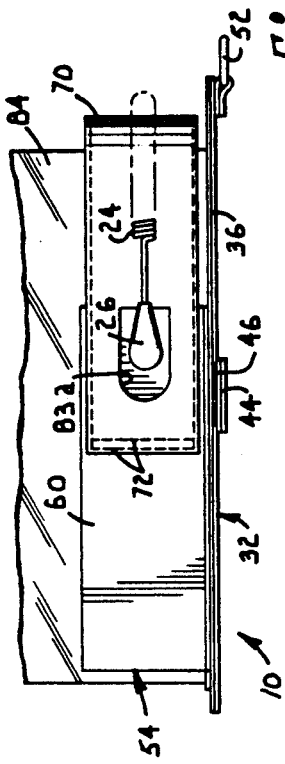
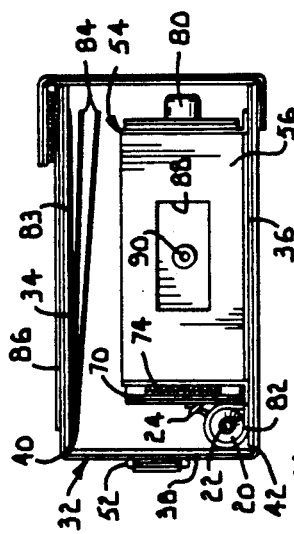
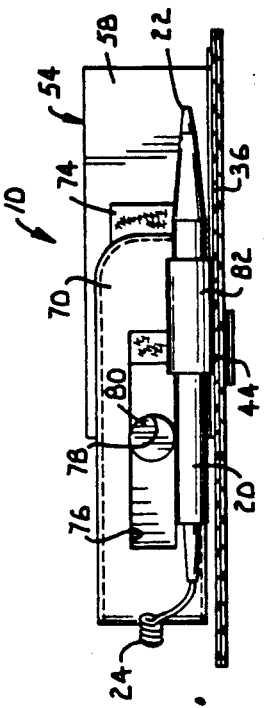

SYSTEM FOR COLLECTING MEDICAL DATA

BACKGROUND AND SUMMARY OF THE INVENTION

This invention relates generally to medical procedures and more particularly to a system for collecting medical data and other information.

The treatment of patients in hospitals and other medical facilities requires numerous procedures to be carried out. For example, health car professionals such as physicians, therapists, nurses, technicians and others must review patients' medical charts from time to time, render treatment or perform various procedures, and record on the charts the results of the procedure or treatment, the assessment of the patients' condition, or other information. In the past, the charts have been reviewed mainly at a nurse's station or other location, and the information has been manually written on the medical chart. Although hand held computing devices have been used, it has been necessary for information to be entered through a small key pad which is different to use, particularly when a large volume of data must be typed on the key pad. Consequently, the use of hand held data terminals has not added appreciably to the efficiency of medical data collection, and it remains a slow cumbersome and inefficient process which detracts from hospital efficiency and effective patient care.

The present invention provides a medical data collection system which combines the best features of manual and computerized procedures while avoiding their undesirable aspects. In accordance with the invention, a portable data terminal unit is held in a pocket on one of the folding panels of a carrying case which opens and closes in the manner of a book. A releaseable strap secures the unit in the pocket and yet allows it to be removed for repair, cleaning or other purposes.

The LCD display on the face of the terminal unit projects out of the pocket where it remains readily visible, and the key pad is visible and accessible through a cutout on the front face of the pocket. A scanning wand capable of reading bar codes is held in a sleeve in the case, and the cord which connects the wand with the terminal unit is drawn around the strap so that it does not dangle freely to possibly become entangled with other objects.

The inside of the case has one or more transparent sheaths which hold paper sheets or other documents on which bar coded information is imprinted. The bar codes are visible through the sheaths so that the scanning wand can be withdrawn from its sleeve and scanned over selected bar codes in order to enter the data they represent, which may pertain to procedures or treatments carried out, patient assessment information, results, observations, comments, etc. Time is saved by this process because this information can be quickly entered without the need to type it into the unit on the key pad. Another plastic sheath on the inside of the case may hold work lists containing patient information such as pertinent medical chart data, reports, treatment plans, doctors orders, etc.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a medical data collection system constructed according to a preferred embodiment of the present invention, with the carrying case of the system in its closed position;

FIG. 2 is a front elevational view of the system with carrying case in its open position with one of the bar coded cards partially inserted in its receiving card pocket;

FIG. 3 is a bottom plan view of the system with the carrying case in its open position;

FIG. 4 is a bottom plan view of the system with the carrying case in its closed position;

FIG. 5 is a fragmentary view taken generally along line 5-13 5 of FIG. 3 in the direction of the arrows; and FIG. 6 is a sectional view taken generally along line 6—6 of FIG. 3 in the direction of the arrows.

DETAILED DESCRIPTION OF THE INVENTION

Referring now to the drawings in more detail, the present invention provides a data collection system which includes a carrying case generally identified by reference numeral 10 and a portable data terminal unit identified generally by numeral 12. The data terminal 12 may be of a type which is commercially available and which is used to collect data in a variety of applications such as in electronic ordering systems, salesman order entry systems, inventory systems, payroll systems, and hospital data collection systems. The terminal unit 12 is small enough and light enough to be carried in the hand and is normally 6 or 7 inches long, approximately 4 inches wide, and 1-1½ inches deep. The front face of the terminal unit 12 is provided with a key pad 14 having a plurality of individual keys 16 used to enter data, carry out programming instructions and perform other functions. Above the key pad 14, the front face of the terminal has a display screen 18 which may be a liquid crystal display (LCD).

The terminal unit 12 has the capability of bar code scanning, and this is carried out by a scanning wand 20 having a scanning tip 22 which may be scanned over bar codes in order to read the bar coded information and enter it into the terminal unit. The wand 20 is carried on a flexible cord 24 which in turn connects with a jack 26 that may be plugged into a socket on one side of the housing of the terminal unit 12.

The bar code information that may be read by the scanning wand 20 is imprinted on one or more rectangular cards or sheets, one of which is shown in FIG. 2 and designated by numeral 28. The face of each sheet 28 is provided with bar codes 30 which may be arranged in rows or columns or another suitable form. Each code 30 represents information which is useful in the data collection process and which may be input to the terminal unit 12 by passing the scanning wand 20 over the bar code 30. Each bar code 30 has an associated printed description 31 which indicates the nature of the information represented by the bar code.

The carrying case 10 is specially constructed so that it can hold the data terminal unit 12 in a convenient manner and still permit the unit to function normally. The case 10 has a body which is generally designated by numeral 32 and which includes flat, rectangular front and back panels, 34 and 36, respectively. The two main panels 34 and 36 are connected with one another by a spine 38 which is smaller than the main panels 34 and 36.

Panel 34 is connected with spine 38 along a fold line 40, while the back panel 36 is similarly connected with the spine along another fold line 42. By this arrangement, the body 32 may be folded up in the manner of a book to the closed position shown in FIG. 1. In the closed position, the inside faces of panels 34 and 36 face one another and are located on the inside of the carrying case. The body 32 may also be unfolded to the open position shown in FIG. 2, wherein the body is flat such that the panels 34 and 36 occupy a common plane. The body 32 has a double ply construction in which two lies are connected along stitch lines 43 extending along the four margins of the body 32.

A strap 44 may be used to secure the carrying case in the closed position. One end of strap 44 is secured to the back panel 36, while the opposite end of the strap and the outer face of the front panel 34 are provided with mating hook and loop type fasteners 46 which may be mated together to hold the carrying case in the closed position.

As best shown in FIG. 1, a shoulder strap 48 may be provided for the carrying case 10. Strap 48 has a releaseable hook 50 which may be hooked to a metal ring 52 carried on spine 38 near its upper edge.

The terminal unit 12 is held in an open topped pocket which is generally identified by numeral 54 and which may be mounted on the inner face of either panel 33 or 36 in the illustrated embodiment, pocket 54 is secured to panel 36. As shown in FIGS. 3-6, the pocket 54 has a bottom panel 56 and opposite side panels 58 and 60. As best shown in FIG. 2, pocket 54 has a front panel 62 provided with a rectangular cutout or opening 64 through which the keyboard 14 is exposed and accessible when the terminal unit is inserted into the pocket. A transparent cover (not shown) may optionally be stretched over the opening 64 to prevent contamination while allowing the keys 16 to be visible and to be used. The LCD 18 projects out of the pocket where it is readily visible. The pocket 54 has out turned flanges 66 along its back edges which are stitched at 68 to the back panel 36. The size of pocket 54 is such that the terminal unit 12 fits closely in the pocket and yet can be removed from it when desired.

The terminal unit is held in pocket 54 by a flexible strap 70 which may have a double ply construction. One end of strap 70 is secured to side 60 of the pocket by the stitching 72 (see FIG. 5). The opposite end of strap 70 and the opposite side 58 of the pocket are provided with mating hook and loop fasteners 74. The strap 70 may be drawn tightly over the top of the terminal unit 12, and the mating fasteners 74 may be secured together to hold the strap in place. Thus, the strap 70 securely retains the terminal unit 12 in place in pocket 54 with the bottom of the terminal unit held against the bottom panel 56 of the pocket.

As best shown in FIG. 6, strap 70 is provided with a slot 76 located near the end which carries the fasteners 74. The upper edge of side 58 of the pocket is provided with a semi-circular notch 78 which registers with the slot 76. This permits a button 80 located on the side of the data terminal 12 to project through the notch 78 and the slot 76. A wrist strap (not shown) may extend from the button 80, or the button may serve some other function related to the data terminal 12.

The scanning wand 20 may be received closely in a sleeve 82 which is secured, as by stitching, to the inside face of the back panel 36 at a location adjacent to side 58 of pocket 54. The location of sleeve 82 is such that the cord 24 may be drawn in coiled form along the strap 70, and the scanning wand 20 may be inserted into sleeve 82 with the cord held tautly enough against strap 70 to prevent it from dangling loosely and possibly becoming entangled in other objects. The scanning wand 20 may simply be removed from sleeve 82 when it is to be used. Mating cut outs 83a (FIG. 5) are found in strap 70 and side 60 of the pocket so that the jack 26 can extend from the terminal unit 12 through the cutouts.

The inside face of the front panel 34 is provided with a transparent plastic sheath 83 which is large enough to receive one of the bar coded sheets 28. One or more additional sheaths 84 are connected to the spine 38 on the inside of the carrying case. Sheaths 84 are hinged together and to the spine along one edge and may be folded onto sheath 83 for storage. Each sheath 84 is formed by a pair of transparent plastic panels joined along their side and bottom edges but not along their top edges so that each sheath 84 is open at the top. This permits the sheets 28 to be inserted into the sheath 84 from the top, and it is noted that the sheath panels are transparent so that the bar codes 30 remain visible through them. Sheath 83 is likewise open at the top for receipt of one or more sheets and has a transparent panel through which imprinted information on the sheet is visible.

With reference to FIG. 1, the outside face of the front panel 34 may be provided with a transparent panel 86 which provides a pocket in which additional documentation may be carried. The panel 86 is secured to panel 34 along the top and bottom edges and one side edge, but the edge nearest the spine 38 is not secured so that the documents may be inserted into the pocket through this open side.

As best shown in FIGS. 3 and 4, the bottom panel 56 of pocket 54 has a cut out 88 through which a socket 90 on the bottom of the data terminal 12 is exposed and accessible. Socket 90 may received a mating jack used to connect the terminal unit with other equipment such as a printer, a modem or a central computer.

In use, the terminal unit 12 may be carried in its pocket 54 and secured by strap 70, and the wand 20 may be stored in sleeve 82 with its cord 24 drawn along strap 70. Normally, when the terminal unit 12 is not in use, the carrying case 10 will be folded up to the closed position shown in FIG. 1 and secured in the closed position by applying the mating fasteners 46 together. In the closed position, the carrying case 10 is compact and easily carried, while it substantially encloses the terminal unit 12 and protects it from damage.

A sheet 28 containing bar codes 30 may be held in each of the sheaths 84. The bar coded information borne by these sheets may be of the type used repeatedly by the user, and the bar coded format allows quick and easy entry of the information. The sheets held in sheath 83 may take the form of work lists containing pertinent information about the patient (such as patient demographics, pertinent patient chart data, patient reports and/or comments from previous shifts or earlier patient encounters), as well as orders, indications, objectives, treatment plans and other data. User defined bar codes such as the bar codes 30 with accompanying descriptions 31 may also be provided on the sheets in sheath 83, and these bar codes allow easy recording of patient ordered procedure information. A work schedule may be carried in the outer pocket formed by panel 86.

When the terminal unit 12 is to be used for the entry of data, the fasteners 46 are detached from one another, and the carrying case is folded open to the position shown in FIG. 2. The keyboard 14 is manually accessible for the entry of data and the carrying out of program instructions and other functions, while the display screen 18 is readily visible since it is located out of the pocket 54. If information relating to the bar codes 30 is to be entered, the wand 20 can be removed from sleeve 82 and scanned over the desired bar code 30. It is noted that all of the sheets 28 carried in the various sheaths 83 and 84 are readily accessed by the scanning wand. Since the bar codes 30 are visible through the transparent panels of the sheaths, the tip 22 of the scanning wand can be easily scanned over them so that the desired information is input to the terminal unit 12.

It is thus apparent that the present invention provides a case in which the data terminal unit 12 can be conveniently carried. At the same time, the terminal unit is easily accessible, and fully functional when the carrying case is opened. The bar coded information carried on sheets 28 is likewise easily accessed. The carrying case 10 may be constructed of leather, vinyl or another suitable material and its attractive appearance adds to its appeal.

By using the data collection system of the present invention, the healthcare professional can save valuable time. The time needed to review the medical chart of the patient prior to seeing him or her is decreased because the most pertinent chart data is contained in the printed worklist held in sheath 83. The important chart information is thus readily available at bedside. Likewise, the time needed to record patient information during or after the patient encounter is reduced because the charting can be done directly at bedside by entering data on the portable data terminal which is carried in the case 10. This process is expedited by the use of bar coding since the data available on the bar codes 30 on any of the sheets carried in sheaths 84 can be entered by scanning the wand over the code instead of requiring typed entry via the key pad 14. The "charted" information is later loaded from the portable terminal unit 12 to the main system computer where it becomes part of the general patient records of the medical facility.

It should be noted that the carrying case 10 may be provided in various sizes. For example, one version may be large enough to permit 8 1/2 inch by 11 inch sheets to be carried in the sheath pockets. A smaller version could hold 4 inch by 7 inch cards in the sheaths bearing bar coded and printed information. It should also be noted that the pocket 54 can be provided on either panel, as can sheath 84. Although the system has been described in connection with medical data collection, it can be used in other applications such as inventory control.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A data collection system comprising:
    a portable data terminal unit having a key pad for data input thereto and a cord carrying a scanning wand for reading and entering into the unit bar coded data;
    a carrying case having first and second panels connected to fold between open and closed positions in the manner of a book;
    a pocket on said first panel for receiving and holding said terminal unit, said pocket having a front face presenting an opening through which the keypad is exposed and accessible when the terminal unit is in said pocket;
    releasable means for securing said terminal unit in said pocket, said releasable means comprising a strap on said pocket and means for releasably securing said strap in extension over the terminal unit to hold the terminal unit in said pocket;
    means of maintaining said wand in a storage position in the carrying case; and
    means on said carrying case for holding a document having bar coded data thereon at a location wherein the bar coded data is accessible to be scanned by said wand while the terminal unit is in said pocket.

2. The system of claim 1, including means on said carrying case fort receiving and holding documentation bearing printed information relating to the data collected by the system.

3. The system of claim 1, wherein said pocket is open at the top to receive the terminal unit and includes opposite sides and a bottom against which the terminal unit is held by said releaseable means.

4. The system of claim 1, wherein said one side of the pocket and said strap present registering openings for extension of the cord therethrough and along the strap.

5. The system of claim 4, wherein said means for maintaining said wand comprises a sleeve on said first panel adjacent said other side of the pocket at a location to receive the wand with the cord extending along said strap.

6. The system of claim 1, including a spine connected to said first and second panels along fold lines about which the panels may be folded in the manner of a book between the open and closed positions.

7. The system of claim 1, wherein said means for holding a document comprises a sheath on said second panel for receiving the document, said sheath having a transparent panel through which the bar coded material on the document is visible to permit scanning of the bar coded material by the wand while the document remains in said sheath.

8. In combination with a portable data terminal unit having a key pad, a display screen and a flexible cord carrying a scanning wand for scanning of bar coded information on a document, a data collection system comprising:
    first and second panels each having inside and outside faces, said panels being hinged together for folding movement between a closed position of the case wherein said outside faces are exposed and said inside faces face toward one another, and an open position of the case wherein said inside faces are located side by side in a substantially common plane;
    an open topped pocket on the inside face of said first panel having a size to closely receive the terminal unit therein with the key pad inside of the pocket and the display screen outside of the pocket;

a front panel of said pocket having an opening through which the key pad is displayed when the terminal unit is received in the pocket;

a strap on said pocket having one end connected with one side of the pocket and an opposite end having releaseable means for connection with the other side of the pocket to permit the strap to be drawn over the terminal unit with said releaseable means applied to hold the terminal unit down in the pocket;

a sleeve on said first panel at a location to releaseably receive and hold the scanning wand with the cord extending along said strap; and a transparent sheath on the inside face of said second panel for holding the document with the bar coded information thereon exposed in the open position of the case to permit the scanning wand to be removed from said sleeve and used to scan the bar coded information while the terminal unit remains in said open topped pocket and the document remains in said sheath.

9. The system of claim 8, including a spine between said first and second panels connected therewith to permit said panels to fold about the spine in the manner of a book between the open and closed positions.

10. The system of claim 9, including a second transparent sheath for holding another document bearing bar codes in a manner to maintain the bar codes visible and accessible to the scanning wand, said second sheath having an edge connected to said spine.

11. The system of claim 8, including an opening in said strap for extension of the cord therethrough.

12. The system of claim 8, including means on the outside face of one of said panels for receiving and holding documentation.

13. A system for collecting medical data relating to a medical patient, said system comprising:

a portable data terminal unit having a key pad for data entry and a cord carrying a bar code reader operable to read bar codes and enter into the terminal unit the bar code data;

a carrying case having first and second panels and a spine between said panels connected therewith in a manner permitting the panels to open and close in book fashion;

an open topped pocket on said first panel in which said terminal unit is releaseably received with the key pad exposed and accessible;

a sleeve on said carrying case having a size and shape to releaseably receive said bar code reader in a storage position thereof;

a strap extending from said pocket for holding the terminal unit therein, said strap carrying releaseable fastening means thereon for securing the strap in extension over the terminal unit and said strap presenting an opening for extension of said cord therethrough; and a sheath on said second panel for receiving and holding a document bearing bar codes thereon representing data relating to the patient, said sheath being transparent to provide visual access to the bar codes and permit scanning thereof with said reader while the terminal unit remains in said pocket and the document remains in said sheath.

14. The system of claim 13, including a second sheath for receiving and holding another document bearing patient related bar codes thereon in a manner maintaining the bar codes visible through said second sheath to permit scanning thereof with said reader, said second sheath having an edge connected with said spine.

15. The system of claim 14, including means on the outside of said carrying case providing a pocket for receiving and holding documentation bearing information relating to the product.

16. The system of claim 13, including means on the outside of said carrying case providing a pocket for receiving and holding documentation bearing information relating to the patient.

17. The system of claim 13, wherein:

said terminal unit has a bottom presenting a socket; and said pocket has a bottom panel on which said bottom of the terminal unit is received, said bottom panel having an opening through which said socket is exposed.

18. A data collection system comprising:

a portable data terminal unit having a key pad for data input thereto and a cord carrying a scanning wand for reading and entering into the unit bar coded data;

a carrying case having first and second panels connected to fold between open and closed positions in the manner of a book;

a pocket on said first panel for receiving and holding said terminal unit, said pocket having a front face presenting an opening through which the key pad is exposed and accessible when the terminal unit is in said pocket;

releasable means for securing said terminal unit in said pocket;

means for maintaining said wand in a storage position in the carrying case; and a plurality of sheaths each adapted to hold therein a document having bar coded data thereon and each having a hinge connection to the carrying case, each sheath having a transparent panel through which the bar coded data on the document in the sheath are visible to permit scanning of the bar coded data by the wand while the document remains in the sheath and the terminal unit is in said pocket.

* * * * *